United States Patent [19]

Girdner et al.

[11] 3,900,895

[45] Aug. 19, 1975

[54] MAGNETIC READ-RECORD HEAD WITH HOUSING LOCATOR STRUCTURE

[75] Inventors: William I. Girdner; John H. Miller, III, both of San Jose, Calif.

[73] Assignee: Hewlett-Packard Company, Palo Alto, Calif.

[22] Filed: Oct. 12, 1973

[21] Appl. No.: 405,943

[52] U.S. Cl. .................. 360/121; 29/603; 360/125; 360/129

[51] Int. Cl.$^2$ ...................... G11B 5/27; G11B 5/25; G11B 5/105; G11B 5/42

[58] Field of Search ....... 179/100.2 C; 340/174.1 F; 346/74 MC; 360/104, 125, 126, 127, 119, 120, 121, 129

[56] References Cited

UNITED STATES PATENTS

| | | | |
|---|---|---|---|
| 3,079,467 | 2/1963 | Rettinger | 179/100.2 C |
| 3,414,971 | 12/1968 | Boehme | 179/100.2 C |
| 3,744,040 | 7/1973 | Honegger et al. | 360/121 |

*Primary Examiner*—Bernard Konick
*Assistant Examiner*—Tupper R. S.
*Attorney, Agent, or Firm*—Patrick J. Barrett

[57] ABSTRACT

A magnetic read-record head is built on a transducer frame and a return core frame. The transducer frame is made by machining an assembly of two concentric cylindrical members to produce a frame with a central locator bar. Each transducer has a magnetic core with a notch in it and a coil wound around a portion of the core. The core notch fits over the locator bar to align all the transducers in the transducer frame. The return core frame receives magnetic cores in the form of U-shaped clips. After the clips are fastened to the return core frame, the curved portion of the U is removed leaving two rows of return cores. Then the return frame, with the cores, is attached to two transducer frames full of transducers to make a completed multi-channel read-record head.

4 Claims, 10 Drawing Figures

MAGNETIC READ-RECORD HEAD WITH HOUSING LOCATOR STRUCTURE

BACKGROUND AND SUMMARY OF THE INVENTION

Magnetic tape reading and recording heads contain one or more transducers for creating or detecting changes in magnetic field in a magnetic recording tape. Such transducers include a magnetically permeable core with a coil wound around it and a return core to make a complete magnetic path. The reading and recording of magnetic patterns take place at a gap between the transducer core and return core and this gap is located at a surface of the head over which the tape passes. Digital tape recording heads usually have a large number of channels, such as 7 or 9, and each channel must have a separate read transducer and record transducer. Thus, a 9-channel head has 18 transducers. In the past it has been the practice to assemble transducers into a tape head frame using an external fixture or jig to properly align each of the transducers before it is permanently fastened in place. These assembly and aligning operations are quite time consuming and require costly manufacturing fixtures.

According to the preferred embodiment, the invention described herein includes a cylindrical shaft with a cylindrical plug on one end which fits within a cavity in another cylindrical member. This member is machined to form a framework having an exposed central cavity containing the cylindrical shaft. This framework supports a plurality of magnetic transducers made of a magnetically permeable material with a coil wound about a portion of each core. Each magnetic transducer core has a V-notch which engages the central shaft, aligning that transducer with the other transducers. Because the magnetic transducer core frame includes alignment means for the core, it reduces the manufacturing fixturing necessary to assemble this magnetic read-record head.

The preferred embodiment also includes another conductive support member for holding cores that provide the magnetic return path for each of the transducers. The return cores are formed in pairs as a U-shaped clip which is placed over a thin central portion of the support member. After the return cores and associated magnetic shields are fastened permanently in place, the curved portion of the U is removed to form two separate rows of return cores. Next, a groove is machined in each side of the member containing the return cores and parallel to the face over which the magnetic tape will pass. This groove defines the depth of the magnetic recording gap so that this gap distance may be accurately determined at the time of manufacture and may be subsequently monitored during use of the recording head. The head assembly is completed by fastening together two frames containing transducers and the central support members holding the return cores and appropriately machining the surface of the head over which the tape will pass.

DETAILED DESCRIPTION OF THE PREFERRED EMBODIMENT

Figure 1:
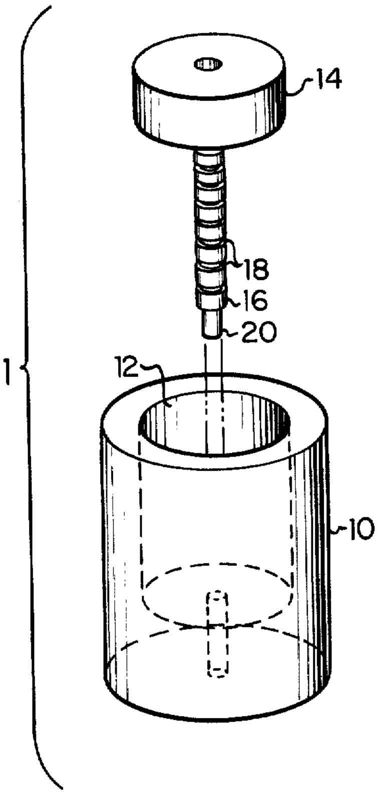
FIG. 1 shows the two cylindrical members used to make a transducer frame.

FIG. 1 shows a cylinder 10 with a cylindrical central cavity 12. A cylindrical plug 14 is machined slightly smaller than cavity 12 so that it will fit within the cavity. Attached to plug 14 is bar 16 which has a number of circular slots 18 along its length. When plug 14 is inserted in cavity 12 an end 20 of bar 16 will engage a hole in cylinder 10 (not shown). Both of these pieces may be made of preferably conductive materials such as aluminum, brass or copper although applicants have found tellurium copper particularly suitable with this application. The use of components with axial symmetry is particularly advantageous since they can be inexpensively produced on a screw machine. After these two pieces are assembled together they may be permanently fastened by soldering, for example. This assembly can also be formed from a tubular section and a bar having a plug on each end.

Figure 2:
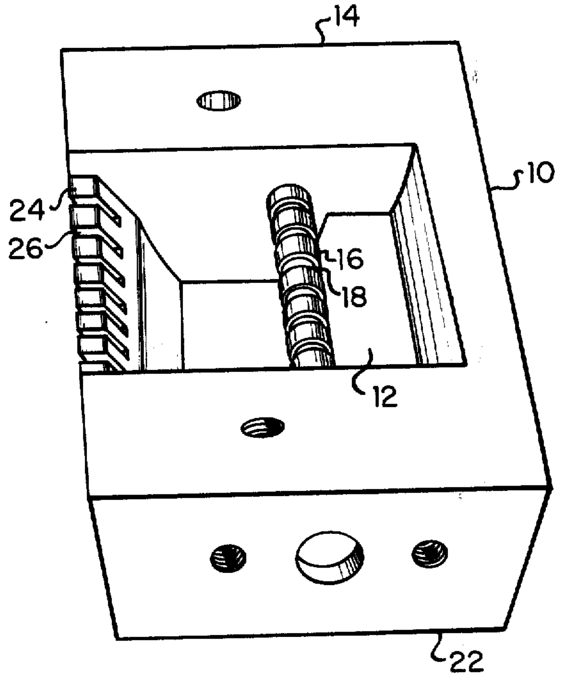
FIG. 2 shows a transducer frame.

As shown in FIG. 2 the assembled cylinder and plug are then machined to form a transducer frame 22 which has a central cavity 12 with the slotted bar 16 for receiving magnetic transducers. Transducer frame 22 includes a surface 24 for supporting magnetic transducers, and this surface has slots 26 which align with slots 18 in bar 16.

Figure 3:
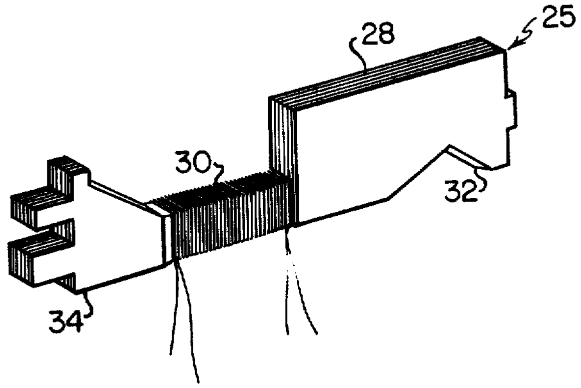
FIG. 3 shows a magnetic transducer.
Figure 4:
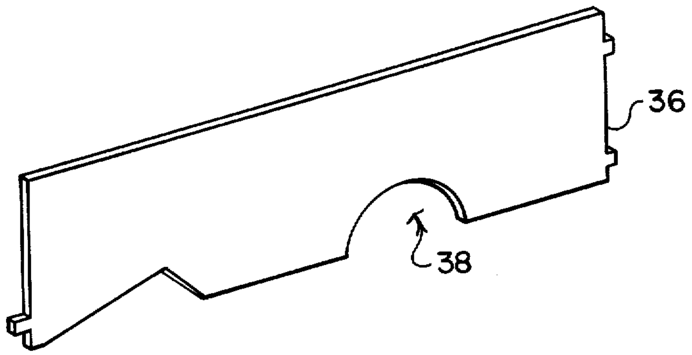
FIG. 4 shows a shield for a magnetic transducer.

FIG. 3 shows a transducer 25 formed from a transducer core 28 with a transducer coil 30 wound on a portion of the core. Typically such cores are fashioned from thin sheets of magnetically permeable material that have been laminated together. Each transducer core includes a notch 32 and a transducing end 34. FIG. 4 shows a transducer shield 36 which is typically made by laminating a magnetic shielding material such as mumetal with an electrical conductor such as copper. Each transducer shield includes a notch 38.

Figure 5:
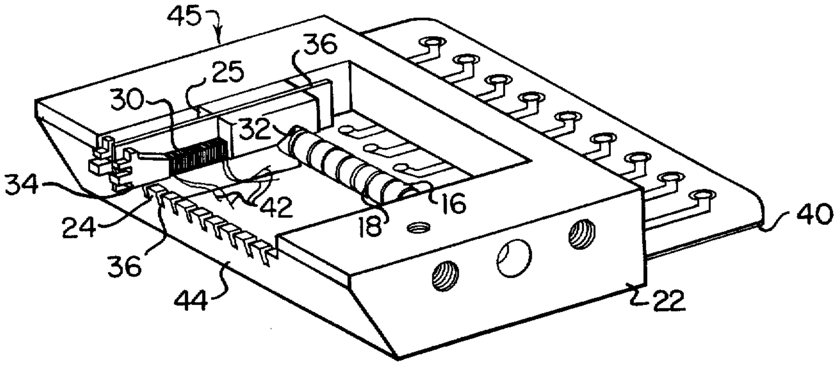
FIG. 5 shows a shield and a magnetic transducer assembled in a transducer frame.

As shown in FIG. 5 transducer 25 is inserted into transducer frame 22 by placing notch 32 over bar 16 and resting end 34 on surface 24. Transducer shield 36 fits along side transducer 25 and notch 38 in the transducer shield fits within one of the circular slots 18 in bar 16 and one of the notches 26 in surface 24. A terminal board 40 is fastened to transducer frame 22 to receive leads 42 from transducer coil 30.

When each of the transducers and transducing shields has been assembled into the transducer frame, they may be permanently fastened therein by potting the assembly in a material such as epoxy making a completed transducer assembly 45. Bar 16, which engages notch 32 in each of the transducers, serves to locate each of the transducers with respect to a frontal face 44 of transducer frame 22, over which the recording tape will pass. Having these locating means built into the transducer frame eliminates the need for expensive external tooling to locate the transducers with respect to the frame during the potting operation. It may still be desirable to provide a tool which will properly space the transducers from each other during the potting operation. The transducer shields between each of the transducers also help to locate the transducers with respect to each other and thereby reduce assembly time.

Figure 6:
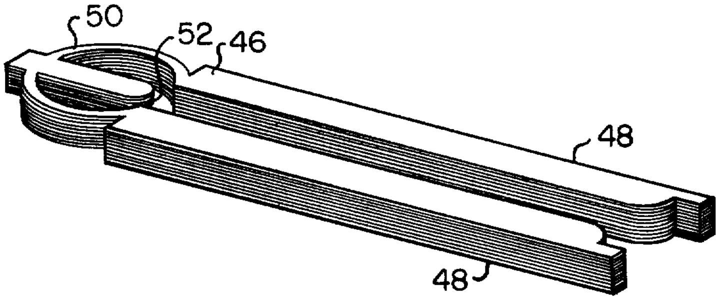
FIG. 6 shows a U-shaped clip having two return cores.
Figure 7:
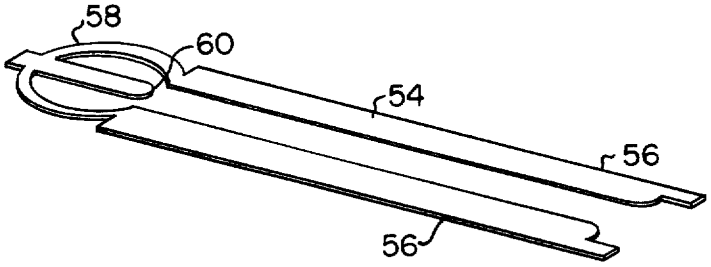
FIG. 7 shows a U-shaped clip having two shields for return cores.

FIG. 6 shows a U-shaped return core clip 46 having two legs that will form return cores 48. The return core clip is typically made of the same material as transducer core 28. Curved portion 50 of the return core clip also includes a gauge tab 52 whose function will be subsequently described. In FIG. 7, a U-shaped return core shield clip 54 is shown having two legs that will form return core shields 56. The curved portion 58 of this clip also includes a gauge tab 60.

Figure 8:
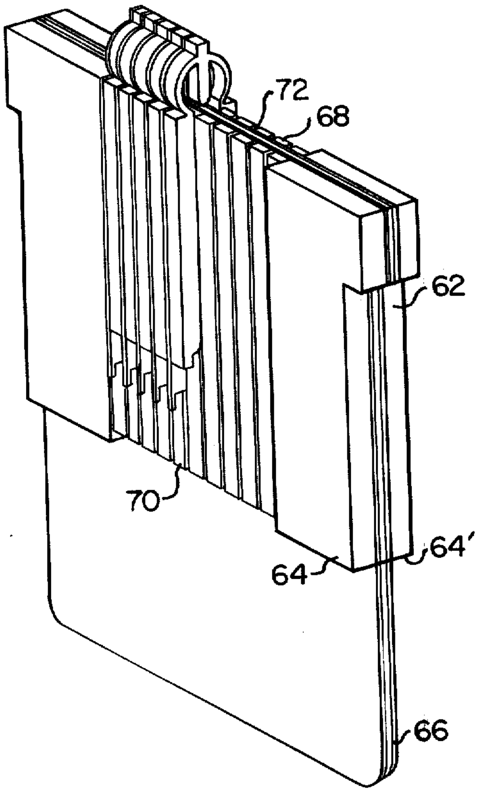
FIG. 8 shows a return core support member with return cores and magnetic shields placed thereon.

FIG. 8 shows a return core frame 62. The frame is constructed from two frame portions 64 and 64′ and a central magnetic shield 66. Frame portions 64 and 64′ are typically made of the same material as transducer frame 22; and shield 66, from the same material as transducer shield 36. Each frame portion 64 has an end 68 across which the magnetic tape will pass and a face 70 along which the return cores and return core shields will be fastened. The faces 70 of each frame portion 64 are substantially parallel. Return core clips 46 and return core shield clips 54 are placed over return frame 62 such that the legs 48 of return core clips 46 are in contact with each face 70. The legs 56 of return core shield clips 54 fit in slots 72 in each of the faces 70. Gauge tabs 52 and 60 properly align the return core clips and return core shield clips, respectively, with end 68.

After the clips 46 and 52 are placed on return frame 62 they are permanently fastened in place by, for example, potting in epoxy. After the epoxy has been cured, the curved portions 50 and 58 of the clips are removed, leaving the individual cores and shield fastened to the return core frame.

Figure 9:
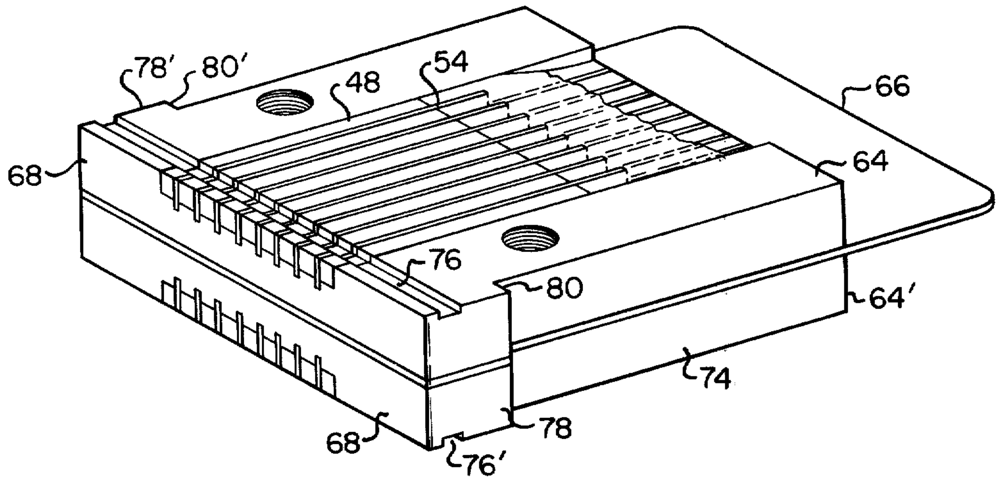
FIG. 9 shows a return core support member with the return cores and shields fastened thereon.

FIG. 9 shows a completed return core assembly 74 with grooves 76 and 76′ cut through frame portions 64 and 64′ as well as each of the return cores and return core shields. Grove 76 is cut parallel to surface 68 and is used to define accurately the magnetic transducing gap depth, which is described in greater detail subsequently. Return core assembly 74 has a pair of tabs 78 and 78′ and each tab has a reference surface 80 and 80′ respectively. Grooves 76 and 76′ are accurately located with respect to the reference surfaces 80, and these reference surfaces, in turn, provide an external measure of the location of one edge of the transducing gap, the other edge being at surface 68.

Figure 10:
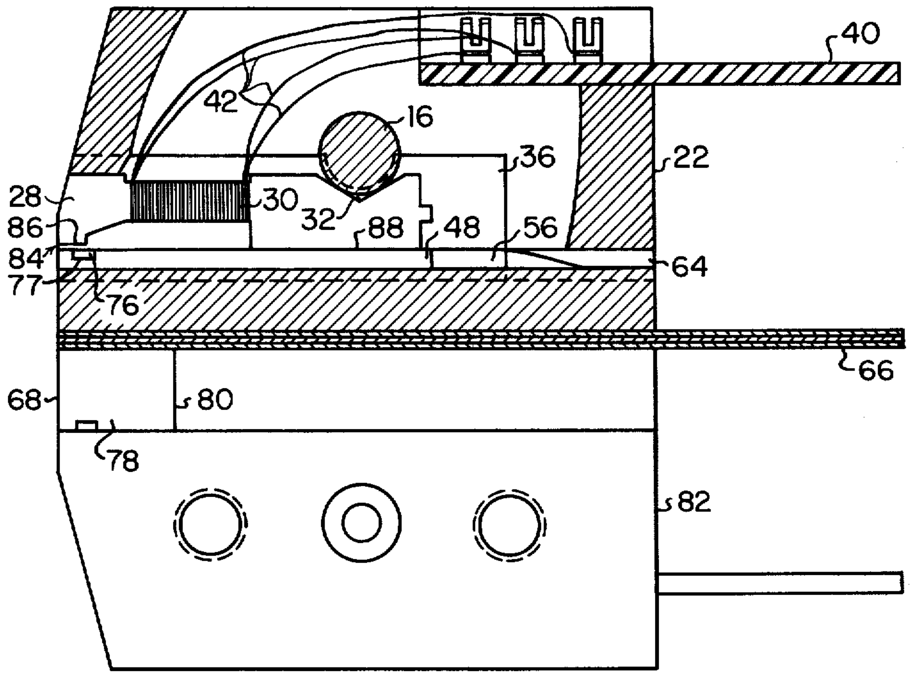
FIG. 10 shows a cross-sectional view of a magnetic read-record head according to the preferred embodiment of the present invention.

FIG. 10 shows a completed read-record head assembly 82 in partial cross-section. At end 68 there is a transducing gap 84 between the transducer core 28 and return core 48. As can be seen by the drawing the depth of the transducing gap 84 measured along a horizontal line in the drawing is defined by end 68 and the left edge 77 of groove 76. To maintain a constant gap width, i.e., the distance between transducer core 28 and return core 48, a non-magnetic gap material 86 is inserted between the cores. A typical material for the gap material is "Havar," a non-magnetic watch spring material. Typical gap widths are 90$\mu$ inches for a read transducer and 220$\mu$ inches for a record transducer. Cores 28 and 48 may be in contact at surface 88 as shown in the figure or may be separated by a thin piece of insulative material such as "Mylar." In most recording heads, a residual flux is present at the transducing gap when power to the head is shut off, and this residual flux can cause unwanted erasures from the recording tape. It has been found that this residual flux can be reduced by having a nonmagnetic and preferably insulative material between cores 28 and 48 at surface 88 and a relatively more magnetic material, such as "Havar," in transducing gap 84.

After two transducer assemblies 45 have been fastened to a return core assembly 74, end 68 and the adjacent areas of the transducer assemblies are machined to the desired shape so the tape will pass smoothly over the head. In this configuration, one transducer assembly will serve as a read head and the other as a record head. It should be appreciated that other recording media, such as flexible discs, can also be used with the heads disclosed herein.

We claim:

1. An electromagnetic read-record head having a read-record surface and comprising:

a plurality of electromagnetic transducers, each comprising a transducer core having a transducing end with a first pole face and a first read-record surface portion, having a middle segment with a coil would thereabout, and having another end with a positioning notch therein;

a transducer frame having a support section to support the transducing end of each transducer, the support section having a second read-record surface portion, and the transducer frame also having a cylindrical support bar with annular slots and spaced apart from and parallel to the support section for supporting and positioning each transducer core other end by engaging each transducer positioning notch, thereby providing mutual alignment of the transducer first pole faces;

shielding means comprising a magnetic shield between each two transducers for magnetically shielding each transducer from others of the transducers each shield having a notch for engaging one of the annular slots in the support bar;

return means for providing a separate magnetic flux path for flux in each transducer core comprising a plurality of return cores, each having a second pole face at one end, and positioned in substantial alignment with the transducers, with each first pole face facing one second pole face and spaced apart therefrom forming a transducing gap between each transducer core and return core at the read-record surface; and holding and positioning means for holding and positioning the return cores in corresponding alignment with the transducer cores comprising a return frame having a substantially flat read-record surface portion with a lengthwise edge, and having a face formed at substantially a right angle to the flat read-record surface portion, the face extending along the lengthwise edge and holding the return cores therein.

2. An electromagnetic read-record head as in claim 1 wherein:

the return frame and return cores have a groove through a portion thereof substantially parallel to the read-record surface for defining the length of the second pole faces from the read-record surface, thereby defining the gap depth; and the return frame has a protrusion therefrom which has a reference surface parallel to the groove and is spaced from the groove a predetermined distance to facilitate measurement of the depth of the transducing gaps.

3. An electromagnetic read-record head having a read-record surface and comprising:

a plurality of electromagnetic transducers, each comprising a transducer core having a transducing end with a first pole face with a first edge which is aligned with each other first pole face first edge at the read-record surface, having a second edge spaced away from the read-record surface, and having a first pole face dimension measured from the first edge to the second edge;

holding means for holding the transducers in alignment;

a plurality of return cores having an end with a read-record surface portion and providing a separate magnetic flux path for magnetic flux in each transducer;

a return core frame having a substantially flat read-record surface portion, the frame holding the return cores in alignment so that the return core read-record surface portions are flush with said frame read-record surface portion, the return core frame and return cores in combination having a groove formed in a portion thereof with the groove having an edge parallel to the read-record surface portion for forming a plurality of relatively uniform and aligned second pole faces having a second pole face dimension measured from an edge of each return core read-record surface portion to the groove edge, the second pole face dimension being smaller than the first pole face dimension, the return core frame being connected to the holding means with each first pole face first edge aligned with the return core read-record surface edge and with each first pole face facing a corresponding second pole face in a spaced-apart relationship forming a plurality of transducing gaps, each gap having relatively uniform depth established by and equal to the second pole face dimension, thereby providing relatively uniform output voltage from each transducer in the read-record head, the return core frame also having a reference surface thereon, parallel to the groove and located a predetermined distance from the groove to facilitate measurement of the depth of the transducing gaps; and shielding means for magnetically shielding each transducer and return core combination from others of the transducer and return core combinations.

4. An electromagnetic read-record head as in claim 3 wherein:

each transducer core has an other end with a positioning notch therein;

the holding means comprises a transducer frame having a straight support section to support the transducing end of each transducer, and having a support bar spaced apart from and parallel to the support section supporting and positioning the transducer core other end by engaging the positioning notch; and the reference surface is on a lateral protrusion from the return frame.

* * * * *

UNITED STATES PATENT OFFICE
CERTIFICATE OF CORRECTION

Patent No. 3,900,895 Dated August 19, 1975

Inventor(s) William I. Girdner and John H. Miller III

It is certified that error appears in the above-identified patent and that said Letters Patent are hereby corrected as shown below:

Column 4, line 26, "would" should read -- wound --;

Sheet 4 of the drawings should be included to show Figures 6 and 7 as shown below:

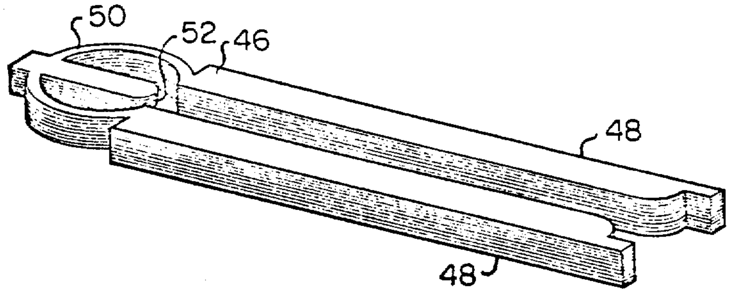

Figure 6

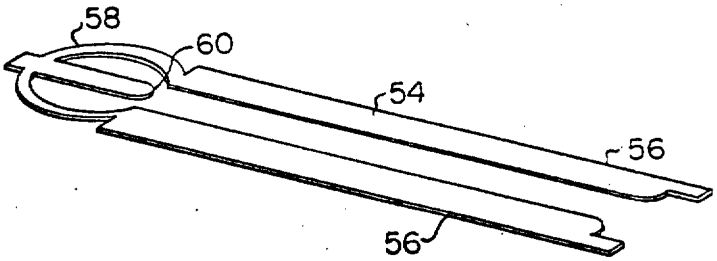

Figure 7

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*